United States Patent [19]

Honami et al.

[11] Patent Number: 5,524,386
[45] Date of Patent: Jun. 11, 1996

[54] METHOD AND APPARATUS FOR UNITING A SCION TO A STOCK

[75] Inventors: Nobuo Honami, Kawachinagano; Haruhiko Murase, Sakai; Yoshifumi Nishiura, Izumi; Tomoaki Taira; Fumio Kobayashi, Both of Sakai; Yoshio Yasukuri, Sakai-gun; Hiroshi Takigawa, Sennan-gun; Osamu Kurokoshi, Nishinomiya, all of Japan

[73] Assignees: Iwatani Sangyo Kabushiki Kaisha, Osaka-fu; Nouji Kumiai Houjin Mikuni Baio Noujou, Fukui-ken, both of Japan

[21] Appl. No.: 376,958

[22] Filed: Jan. 20, 1995

Related U.S. Application Data

[62] Division of Ser. No. 90,589, Jul. 12, 1993, Pat. No. 5,414,958.

[30] Foreign Application Priority Data

Sep. 24, 1992 [JP] Japan ..................... 4-254719
Apr. 6, 1993 [JP] Japan ..................... 5-79745

[51] Int. Cl.⁶ ............................................. A01G 1/00
[52] U.S. Cl. .................. 47/6; 47/58; 30/458; 83/701; 144/286; 144/30
[58] Field of Search ............... 144/28.4, 28.5, 144/28.6, 28.2, 30; 83/701; 30/458; 47/6, 7, 58.1

[56] References Cited

U.S. PATENT DOCUMENTS

| 107,427 | 9/1870 | Wagner | 47/6 |
|---|---|---|---|
| 691,177 | 1/1902 | Cox | 144/28.5 |
| 2,377,888 | 6/1945 | King | 30/458 |
| 3,004,522 | 10/1961 | Kent et al. | 47/6 |
| 4,832,022 | 5/1989 | Tjulkov | 606/202 |
| 5,052,453 | 10/1991 | Chen | 144/28.5 |
| 5,209,011 | 5/1993 | Mori | 47/6 |
| 5,355,755 | 10/1994 | Sakata | 83/701 |

FOREIGN PATENT DOCUMENTS

| 0532064 | 3/1993 | European Pat. Off. | 47/6 |
|---|---|---|---|
| 1328248 | 12/1965 | France | 47/6 |
| 2391640 | 12/1978 | France | 47/6 |
| 2419669 | 12/1979 | France | 47/6 |
| 291094 | 2/1914 | Germany | 47/6 |
| 5-68432 | 3/1993 | Japan | 47/6 |
| 460869 | 1/1973 | U.S.S.R. | 606/22 |

OTHER PUBLICATIONS

"New Grafting Technique", Rodale's Organic Gardening pp. 62–66 Jan. 1987.
Drill Grafting, Pomona, p. 17 Fall 1990.
Patent Abstracts of Japan, vol. 17, No. 382 (C–1085) 19 Jul. 1993 & JP–A–05 068 432, (Kagome) 23 Mar. 1993.
Soviet Patent Abstracts, Section PQ Week 8911, Derwent Publications Ltd., London, GB; AN89–083981 & SU–A–1 423 049, Sidorov, 7 Sep. 1989.

*Primary Examiner*—Henry E. Raduazo
*Attorney, Agent, or Firm*—Jordan and Hamburg

[57] ABSTRACT

A grafting method for uniting a scion to a stock includes forming conical projection on either a lower portion of a scion or an upper portion of a stock, forming a conical recess on either a lower portion of a scion or an upper portion of a stock, and joining the conical projection in the conical recess to unite the scion to the stock. A grafting apparatus includes a holder for holding either a scion or a stock, a die member having a conical hole into which either a scion or a stock is inserted, a cutting blade member arranged and movable along a generatrix of the conical hole, a ultrasonic drive device for moving the cutting blade member upward and downward at a ultrasonic high speed, a rotating drive device for rendering a relative rotation between the holder and the cutting blade member, and an elevating drive device for rendering a relative movement between the holder and the die member.

2 Claims, 16 Drawing Sheets

METHOD AND APPARATUS FOR UNITING A SCION TO A STOCK

This is a division of application Ser. No. 08/090,589, filed Jul. 12, 1993, and now U.S. Pat. No. 5,414,958.

BACKGROUND OF THE INVENTION AND RELATED ART STATEMENT

This invention relates to a grafting method and apparatus for uniting a lower end portion of a scion to an upper end portion of a stock.

Grafting is a plant growing method which produces a new individual plant by uniting a scion having the affinity relative to a stock to the stock in order to improve the acclimation, noxious insect-resistant, flowerability, and fructifiability. In grafting, there have been splice, saddle, and cleft grafting methods, etc.

For example, as shown in FIG. 17, in the cleft grafting method, a lower end portion of a scion 351 is cut up into a wedge-like form by the use of a knife or the like and a corresponding wedge-like slit 353 is formed at an upper end portion of a stock 352. After the lower end portion of the scion 351 is inserted into the slit 353 to unite the vascular bundles of the scion 351 and the stock 352, the united portion is gripped by an auxiliary fixing device such as a clip.

This cleft grafting method of inserting the lower end portion of the scion 351 cut up into the wedge-like form into the slit 353 of the stock 352 has suffered the following problems: 1) a skill is required to unite the scion 351 to the stock 352 in a proper state; and 2) it is difficult to automate the grafting operation. More specifically, uniting surfaces of the scion 351 and the stock 352 consist of a pair of flat surfaces each, and only parts of vessels 354 and sieve tubes 355 constituting the vascular bundles are exposed at opposite uniting surfaces. Accordingly, it is difficult to position and unite the vessels 354 and sieve tubes 355 of the scion 351 to those of the stock 352 accurately. This has stood as a hindrance to the automation. In addition, it has been difficult to automate an operation of attaching the auxiliary fixing device to the united portion of the scion 351 and stock 352 and an operation of detaching the auxiliary fixing device after the uniting portion is connected fast.

Also, it has been very difficult to cut the seedling by means of the razor blade or the like into a proper shape without destroying its tissue having an anisotropic fibroid structure, which accordingly hinders automation of grafting operation. More specifically, to cut the scion 351 into a desired shape while holding a stem of the scion 351 by the holding member, it is necessary to give an appropriate intensity of cutting energy to the razor blade. Unless the necessary cutting energy is given to the cutting blade, the cut surface of the scion 351 will not be finished into the proper cutting surface. On the contrary, if an exceeding cutting energy is applied, the portion of stem of the scion 351 where the holding member holds will be liable to be damaged.

Further, since a cuticle of the scion 351 remains on a portion other than the cut surfaces, roots may come out from the remaining cuticle after the adhesion. This prevents the growth of the stock 352, thereby reducing the growth and thickening of the stock 352, i.e. causing a so-called stock undergrowing phenomenon. Furthermore, the cleft grafting method also suffers the problem that the stock 352 splits as the roots of the scion 351 grow.

In view thereof, it is an object of the invention to provide a grafting method and apparatus which have overcome the above-mentioned drawbacks.

It is another object of the invention to provide a grafting method and apparatus which make it possible to unite a scion to a stock in a proper state without causing the rooting of the scion and the undergrowth of the stock.

It is still another object of the invention to provide a grafting method and apparatus which enable automatic grafting.

It is yet still another object of the invention to provide a grafting method and apparatus which assure easy and accurate cutting of scions and stocks.

SUMMARY OF THE INVENTION

Accordingly, a grafting method of the invention comprises the steps of forming a conical projection on either a lower end portion of a scion or an upper end portion of a stock; forming a conical recess on either a lower end portion of a scion or an upper end portion of a stock; and joining the conical projection in the conical recess to unite the scion to the stock.

It may be preferable that the included angle of the conical projection is identical to the included angle of the conical recess.

Also, it may be appropriate that the conical projection is formed by inserting either the lower end portion of a scion or the upper end portion of a stock in a conical hole formed in a die and provided with a cutting blade along a generatrix of the conical hole; and cutting either the lower end portion of a scion or the upper end portion of a stock by vibrating the cutting blade ultrasonically while rendering a relative rotation between the cutting blade and the scion or stock.

With the above-mentioned grafting methods, either one of a lower end portion of a scion and an upper end portion of a stock is cut up into a conical projection, and a conical recess corresponding to the conical projection is formed at the other. The scion and the stock are united to each other by fitting the conical projection into the conical recess. Accordingly, the scion and the stock can be positioned automatically and united sealably. Also, the scion and the stock can be united in a proper state to thereby obtain an excellent adhesion, and be grown in a well-balanced manner.

Also, the included angle of the conical projection is identical to the included angle of the conical recess. Accordingly, the conical projection can be slid along the inner surface of the conical recess to the deepest point of the conical recess easily.

Further, the conical projection is formed by the cutting blade driven at a ultrasonically high speed. The conical projection is cut without giving an excessive cutting force to the scion or stock. Accordingly, a smooth cutting surface can be provided on the conical projection.

Also, the present invention is directed to a grafting apparatus comprising holding means for holding either a scion or a stock; a die member having a conical hole into which either a scion or a stock is inserted; a cutting blade member arranged and movable along a generatrix of the conical hole; a ultrasonic drive device for moving the cutting blade member upward and downward at a ultrasonic high speed; first drive means for rendering a relative rotation between the holding means and the cutting blade member; and second drive means for rendering a relative movement between the holding means and the die member.

It may be appropriate that the holding means includes a support table having a positioning hole through which either a scion or a stock is inserted; a pair of grip members opposed at the positioning hole, each member being pivotable and having a gripping portion at the positioning hole when the pair of grip members are made in contact with each other; and biasing means for biasing the pair of grip members so as to come into contact with each other.

With the above-mentioned construction, the cutting blade member is arranged along a generatrix of the conical hole formed in the die member, and moved upward and downward at a ultrasonically high speed. Either a scion or a stock is held by the holding member, and is relatively rotated with respect to the cutting blade member and moved down relatively with respect to the die member. This construction is very simple and assuredly produces a conical projection having a smooth surface.

Also, the holding means is provided with the pair of grip members. Accordingly, the scion or stock can be gripped by the grip members in a proper state. This simplifies gripping operation of the scion or stock.

These and other objects, features and advantages of the present invention will become more apparent upon a reading of the following detailed description and accompanying drawings.

DETAILED DESCRIPTION OF THE PREFERRED EMBODIMENTS OF THE INVENTION

Figure 1:
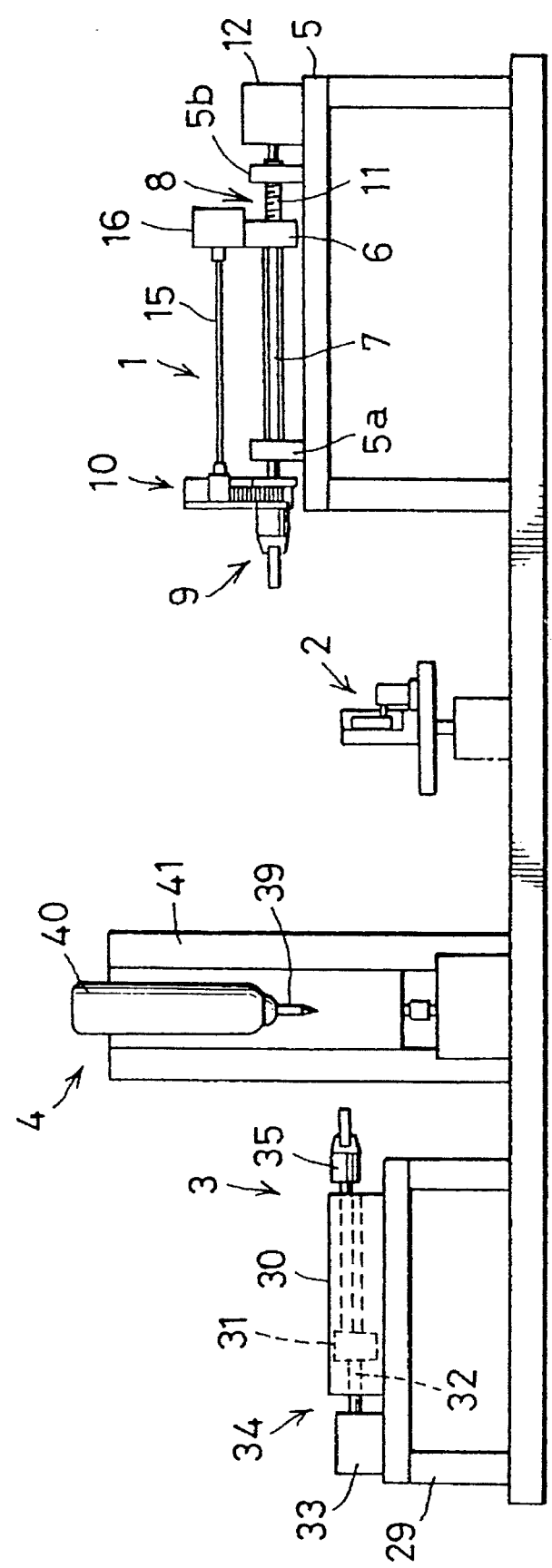
FIG. 1 is a front view showing an overall construction of a grafting apparatus according to the invention.

FIG. 1 shows a grafting apparatus according to the invention. This grafting apparatus is provided with a scion transport assembly 1, a scion machining assembly 2, a stock transport assembly 3, and a stock machining assembly 4. The scion transport assembly 1 holds a scion formed by cutting off a lower end portion of a seedling of a watermelon, tomato, egg plant or the like, and transports the same to positions where it is machined and united to a stock. The scion machining assembly 2 machines a lower end of the scion to form a projected portion which is united to the stock. The stock transport assembly 3 holds a stock formed by cutting off an upper end portion of a seedling having the affinity with the scion and transports the same to positions where it is machined and united to the scion. The stock machining assembly 4 machines an upper end portion of the stock and forms a hole into which the projected lower end portion of the scion is inserted.

The scion transport assembly 1 includes a slide block 6, left and right slide bars 7, a screw feed mechanism 8, a scion holder 9, and a scion elevating mechanism 10. The slide block 6 and the slide bars 7 are supported slidably on a base 5. The screw feed mechanism 8 screw-feeds the slide block 6 and the slide bars 7. The scion holder 9 is mounted at a leading end of the slide bar 7. The scion elevating mechanism 10 moves the scion holder 9 upward and downward.

Figure 2:
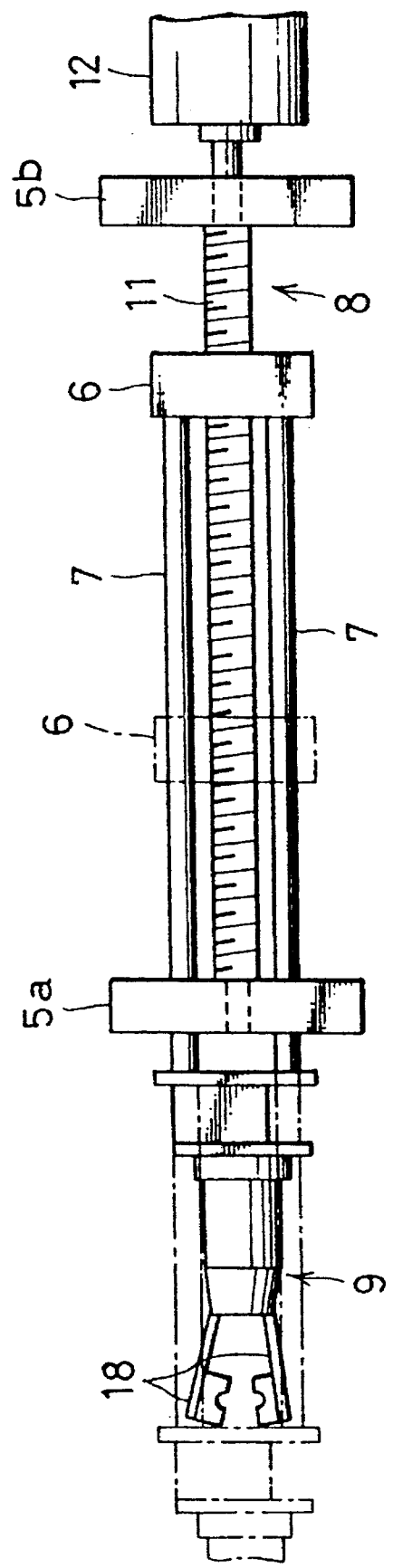
FIG. 2 is a plan view of a scion transport assembly provided in the grafting apparatus.

The screw feed mechanism 8 includes a screw shaft 11 which is spirally fitted into a tapped hole formed in the slide block 6 and is supported rotatably by front and rear support blocks 5a, 5b provided upstanding on the base 5, and a drive motor 12 for drivingly rotating the screw shaft 11. The screw feed mechanism 8 screw-feeds the slide block 6 and the slide bars 7 by rotating the screw shaft 11 by means of the drive motor 12, and thereby the rear-located slide block 6 as indicated by solid lines in FIG. 2 and the scion holder 9 are moved forward as indicated by phantom lines in FIG. 2. In this way, the scion holder 9 is slidably moved to a position where the scion machining assembly 2 is installed and then to a further forward position where the scion is united to the stock.

Figure 3:
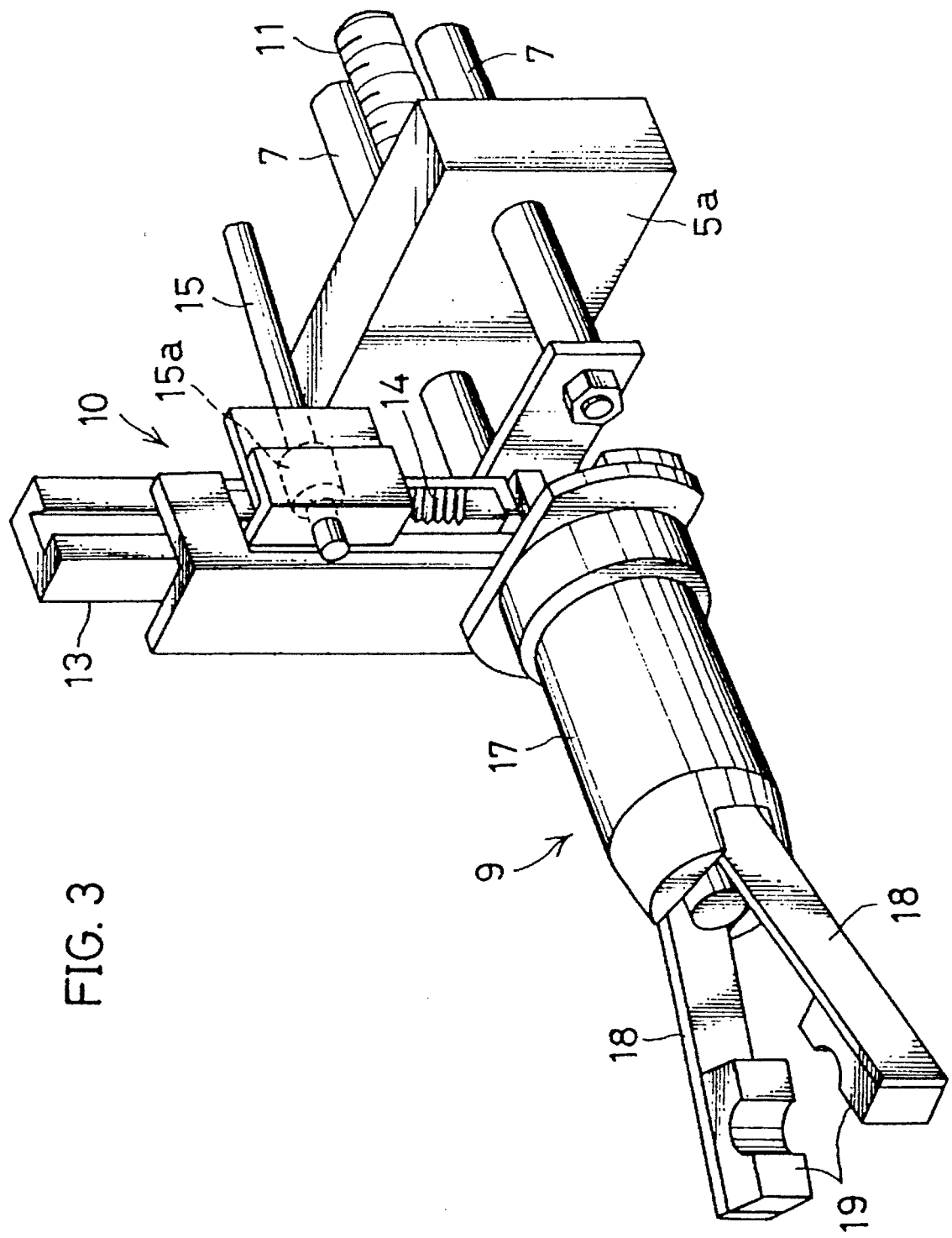
FIG. 3 is a perspective view showing a scion holder and a scion elevating mechanism provided in the grafting apparatus.

The scion elevating mechanism 10 includes a rack gear 14, a rotatable shaft 15, and a drive motor 16 as shown in FIG. 3. The rack gear 14 is supported movably upward and downward on a guide member 13 mounted on a leading end of the slide bars 7. The rotatable shaft 15 includes a pinion 15a meshable with the rack gear 14. The drive motor 16 drivingly rotates the rotatable shaft 15. The scion elevating mechanism 10 moves the rack gear 14 upward and downward by rotating the rotatable shaft 15 and pinion 15a by the driving force of the drive motor 16 to thereby move the scion holder 9 provided integrally with the rack gear 14 from an upper standby position to lower machining position and uniting position.

Figure 4:
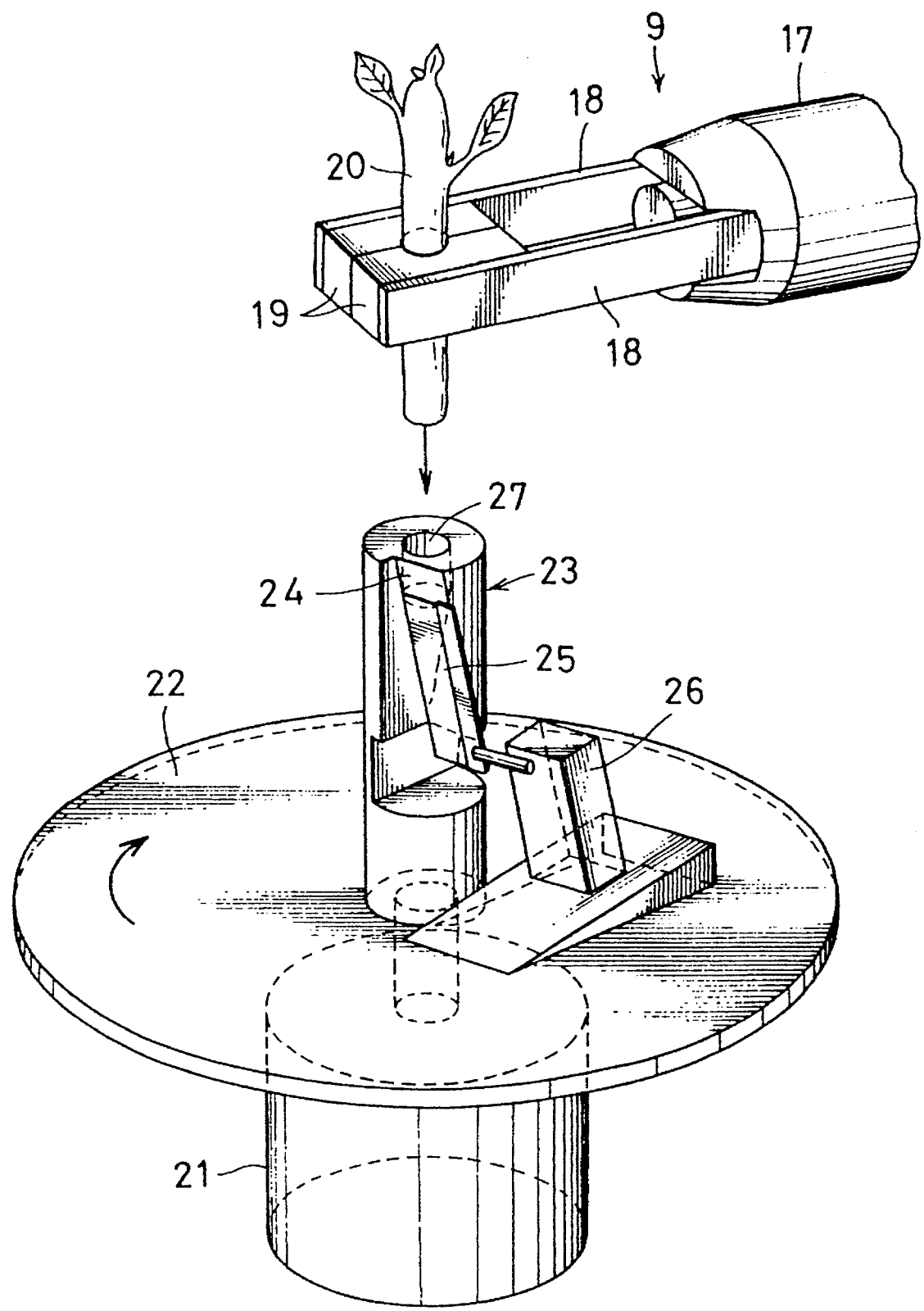
FIG. 4 is a perspective view showing a scion machining assembly provided the grafting apparatus.

The scion holder 9 includes a support portion 17 provided integrally with the rack gear 14, a pair of finger plates 18 supported pivotally on the support portion 17, and an unillustrated drive device provided in the support portion 17. This drive device may be an air cylinder, push-pull solenoid, or the like. The finger plates 18 are driven openably and closably by the drive device, and thereby grips 19 provided on inner surfaces or leading ends thereof are moved pivotally between a released position where the grips 19 are spaced apart and a gripped position where a stem of the scion 20 is gripped by the grips 19 as shown in FIG. 4.

The scion machining assembly 2 includes a turntable 22 which is rotated at about 30 rpm by a drive motor 21, and a taper die member 23 provided projectingly at an upper center portion of the turntable 22. On a circumferential surface of the taper die member 23 is formed a slanting surface 24 along which a cutting blade 25 is provided. The cutting blade 25 is moved upward and downward along the slanting surface 24 about 115 times per second by about 2 mm by a cutting blade driving mechanism 26 including, for example, a reciprocating motor.

Figure 5:
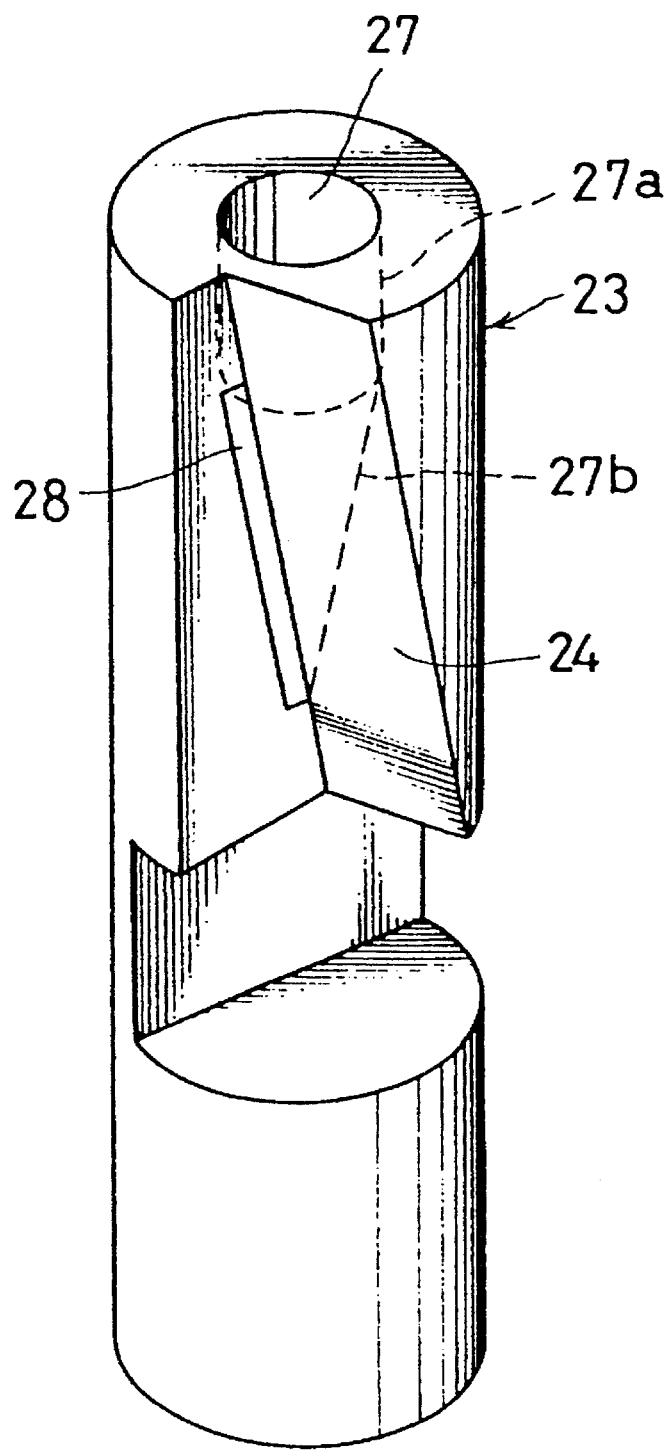
FIG. 5 is a perspective view of a taper die member provided in the scion machining assembly.

As shown in FIG. 5, in the taper die member 23 is formed an insertion hole 27 into which the scion is inserted. The insertion hole 27 consists of a cylindrical upper hole 27a and a conical lower hole 27b which is in communication with a lower end of the upper hole 27a and is tapered downward. A portion of the insertion hole 27 is exposed to a lateral end portion of the slanting surface 24 to thereby form an opening 28 extending along a generatrix of the conical lower hole 27b.

On the other hand, as shown in FIG. 1, the stock transport assembly 3 includes a guide member 30 mounted on a base 29, a slide member 31 supported slidably by the guide member 30, a screw shaft 32 for screw-feeding the slide member 31, and a screw feed mechanism 34 including, for example, a drive motor 33 for rotating the screw shaft 32. The screw feed mechanism 34 causes a stock holder 35 mounted at a leading end of the slide member 31 to move slidably from a backward located stock mounting position to an install position of the stock machining assembly 4 and to a uniting position located forward.

Figure 6:
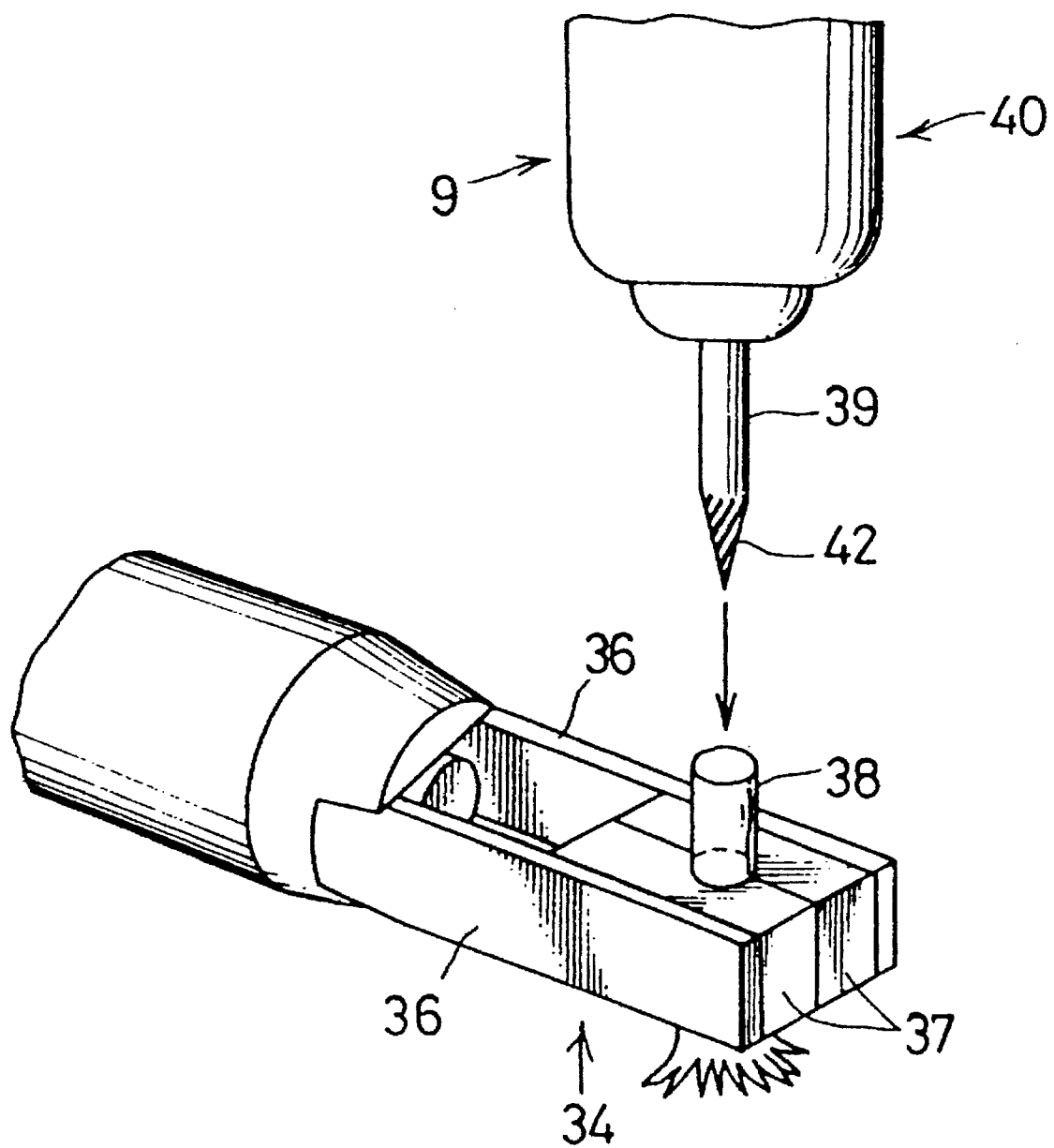
FIG. 6 is a perspective view showing a stock machining assembly provided in the apparatus.

The stock holder 35 includes a pair of finger plates 36 constructed similar to the scion holder 9 as shown in FIG. 6, and an unillustrated drive device for driving these finger plates 36 openably and closably. A stem of a stock 38 is gripped by grips 37 provided at inner surfaces of leading ends of the finger plates 36. The stock machining assembly 4 includes a drill 40 having a cutter 39, and a drill elevating mechanism 41 for moving the drill 40 upward and downward. At a lower end of the cutter 39 is provided a machining portion 42 formed into a conical shape having the same angle as the projected portion 28 of the scion 20 to be machined by the scion machining assembly 2. The drill is rotated at a high speed, e.g., 45000 rpm.

The grafting method according to the invention is implemented as follows using the grafting apparatus thus constructed. The finger plates 18 of the scion holder 9 are caused to grip the stem of the scion 20 which is formed by cutting off the lower end portion of an appropriately grown seedling used as a scion such as an egg plant. Then, the screw reed mechanism 8 of the scion transport assembly 1 is driven to move the scion holder 9 forward. Thereafter, at the time when it is detected by an unillustrated sensor including a limit switch that the scion 20 held by the scion holder 9 has reached above the position where the scion machining assembly 2 is installed, the driving of the screw feed mechanism 8 is stopped to position the scion 20.

Subsequently, the scion holder 9 and the scion 20 are moved downward by the scion elevating mechanism 10, and the lower end portion of the scion 20 is inserted into the insertion hole 27 of the taper die member 23 and is cut up into the conical form which is tapered downward. In other words, the cutting blade 25 is moved upward and downward by the cutting blade drive mechanism 26 and the turntable 22 is rotated by the drive motor 21, to thereby insert and move the lower end portion of the scion 20 downward into the insertion hole 27.

Figure 7:
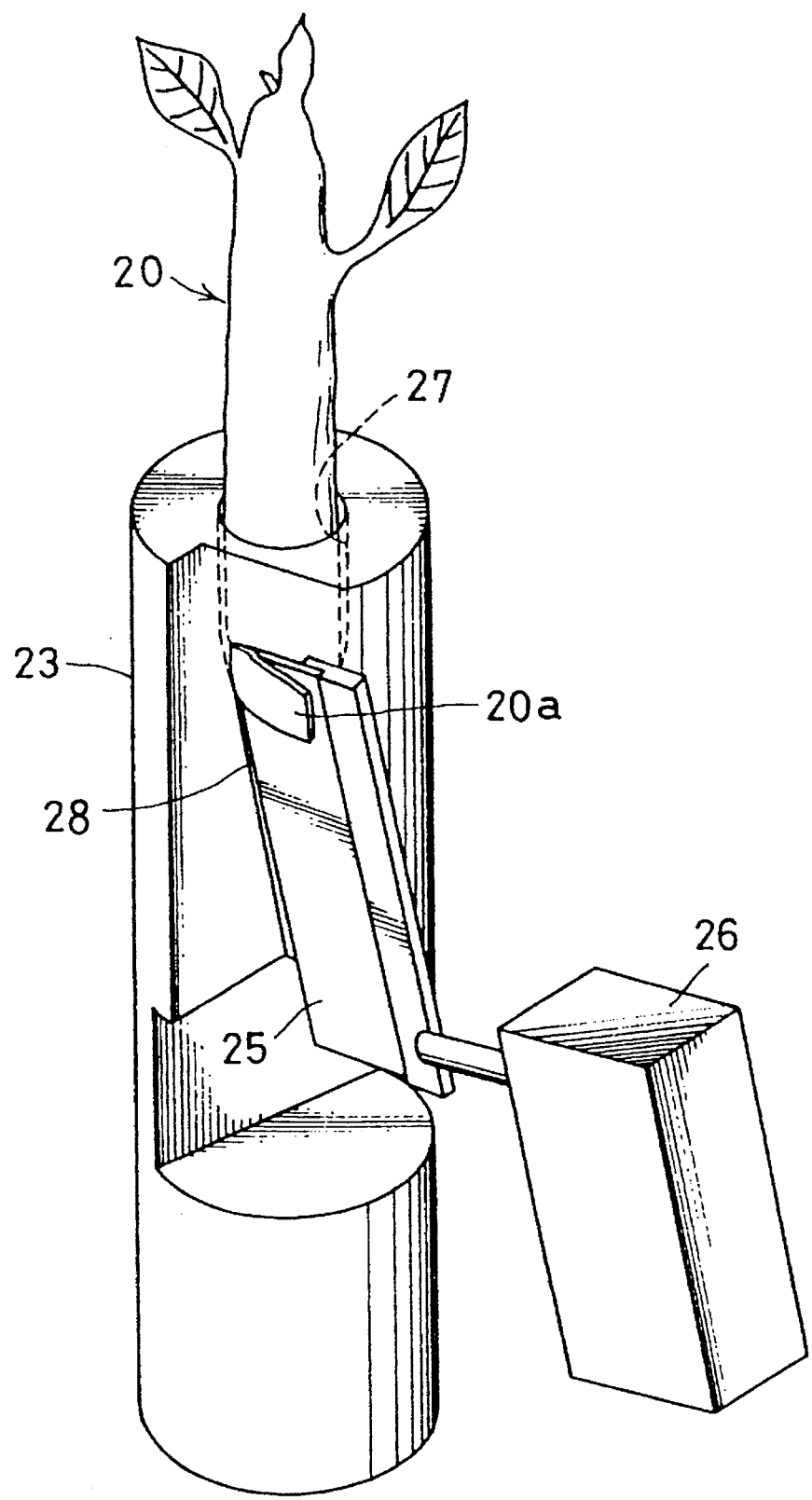
FIG. 7 is a perspective view showing operation of the stock machining assembly.

As shown in FIG. 7, an outer circumferential surface 20a of a portion of the scion 20 projecting out of the opening 28 of the insertion hole 27 is cut slantingly successively by the cutting blade 25. Consequently, the lower end portion of the scion 20 is cut up into the conical form corresponding to the lower portion of the insertion hole 27 to thereby form the projected portion 43 to be united to the stock.

When the unillustrated sensor detects that the formation of the projected portion 43 has been completed, the scion holder 9 and the scion 20 are caused to move upward by the scion elevating mechanism 10 so as to pull the lower end portion of the scion 20 out of the insertion hole 27. Thereafter, the scion holder 9 and the scion 20 are transported further forward to the uniting position where the scion 20 is united to the stock 38 by the screw feed mechanism 8. The positioning of the scion holder 9 and the scion 20 at the uniting position may be done in accordance with an output signal of a sensor for detecting the position of the scion holder 9, or may be done using a stopper provided at the screw feed mechanism 8.

At the same time when the projected portion 43 of the scion 20 is formed, the stock 38 formed by cutting the upper portion of a proper seedling having the affinity with the scion 20 is held by the finger plates 36 of the stock holder 35. Thereafter, the stock holder 35 is transported forward by the screw feed mechanism 34 of the stock transport assembly 3 up to the position where the sensor is disposed. The stock 38 held by the stock holder 35 is moved below the position where the stock machining assembly 4 is installed so as to be positioned.

Figure 8:
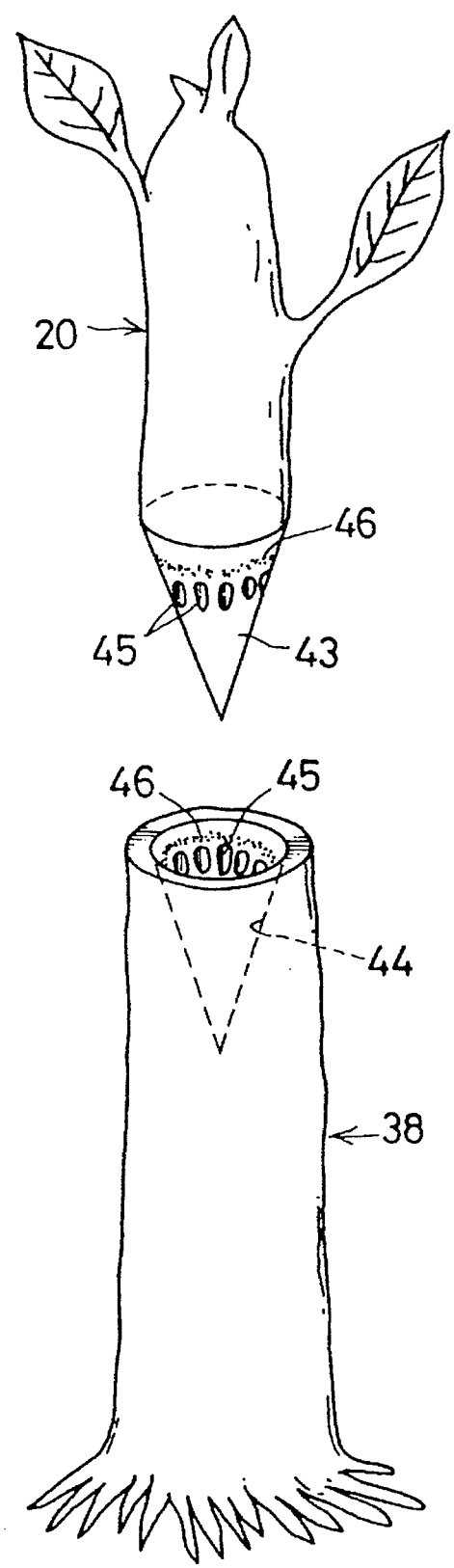
FIG. 8 is a perspective view showing a scion and stock machined by the apparatus.

Subsequently, the drill 40 and the cutter 39 are moved downward by the drill elevating mechanism 41 while the cutter 39 is drivingly rotated by the drill 40. Consequently, the machining portion 42 of the cutter 39 is pressed against an upper end face of the stock 38 and the conical recessed hole 44 tapered downward is formed at the upper end portion of the stock 38 (see FIG. 8). When the unillustrated sensor detects that the cutter 39 has moved down to a specified position and the formation of the recessed hole 44 has been completed, the drill 40 and the cutter 39 are moved upward away from the stock 38 by the drill elevating mechanism 41. Thereafter, the stock holder 35 and the stock 38 are transported further forward to the uniting position by the screw feed mechanism 34.

Figure 9:
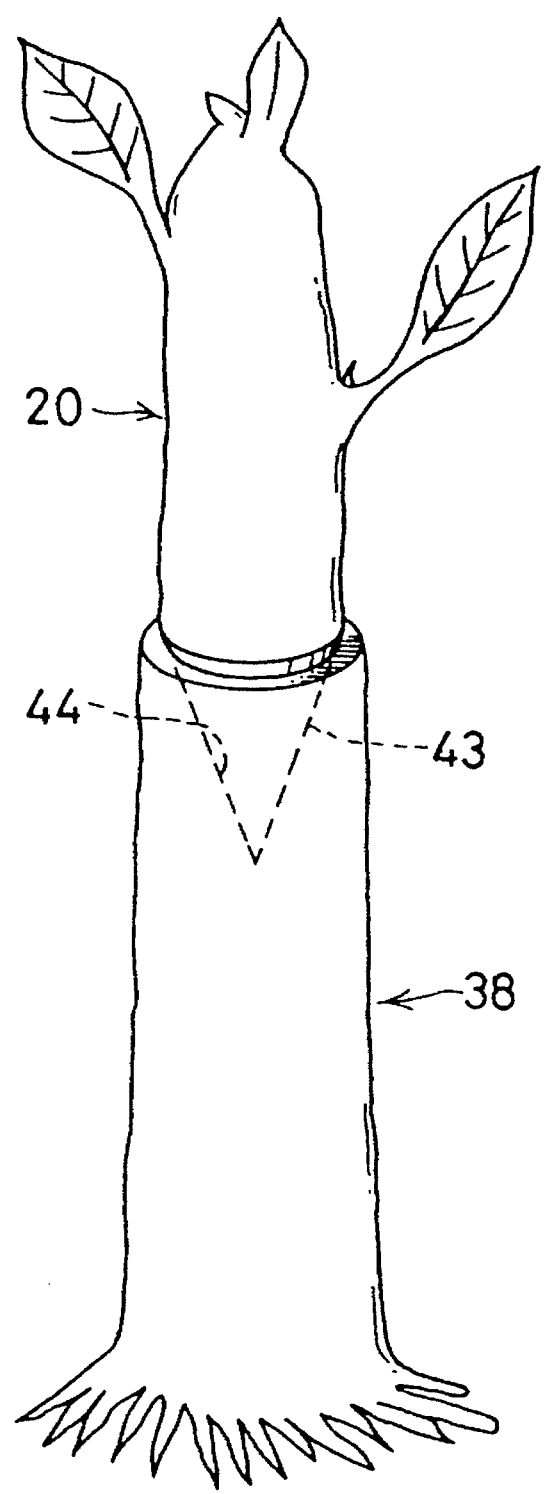
FIG. 9 is a perspective view showing a state where the scion is united to the stock.

After positioning the scion 20 and the stock 38 relative to each other, the scion holder 9 and the scion 20 are moved downward by the scion elevating mechanism 10 so as to insert the projected portion 43 of the scion 20 into the recessed hole 44 of the stock 38. Thereby, the scion 20 and the stock 38 are connected with each other as shown in FIG. 9 to produce a grafted seedling. Subsequently, the finger plates 18 of the scion holder 9 and the finger plates 36 of the stock holder 35 are caused to pivot to the respective released positions, and the scion 20 and the stock 38 are released from the gripped states thereof. Then, the grafted seedling is transferred onto an unillustrated transport means including a belt conveyor and discharged.

In this way, the lower end portion of the scion 20 is cut up into a tapered shape to form the projected portion 43 and the conical recessed hole 44 corresponding to the projected portion 43 is formed at the upper end portion of the stock 38. The scion 20 and the stock 38 are united by inserting the projected portion 43 into the recessed hole 44. Accordingly, the scion 20 and the stock 38 can be united in a proper state and an excellent adhesion is obtainable.

More specifically, by forming the projected portion 43 and the recessed hole 44, vessels 45 and sieve tubes 46 are allowed to be exposed entirely over the circumferential surfaces of the projected portion 43 and the recessed hole 44. Thus, the vessels 45 and the sieve tubes 46 of the scion 20 and the stock 38 can be positioned easily and properly when the projected portion 43 of the scion 20 and the recessed hole 44 of the stock 38 are united.

In addition, when the projected portion 43 of the scion 20 is inserted into the recessed hole 44 of the stock 38, the conical surface constituting the projected portion 43 and the recessed hole 44 serve as guiding surfaces which allow the projected portion 43 and the recessed hole 44 to be positioned automatically. Thus, the projected portion 43 is inserted into the deepest part of the recessed hole 44 easily, so that the scion 20 and the stock 38 can be united sealably.

Accordingly, the scion 20 and the stock 38 can be united without requiring a cumbersome operation including the gripping of the upper end portion of the stock 38 with an auxiliary fixing device such as a clip after the insertion of the scion 20. After the grafting, water and nutrients absorbed by the roots of the stock 38 are supplied smoothly to the scion 20 through the vessels 45 and photo-synthetic products such as starch produced through the photosynthesis conducted by the grown up scion 20 are supplied to the stock 38 through the sieve tubes 46. Therefore, both the scion 20 and the stock 38 are able to grow in a well-balanced manner.

Further, the cuticle of the scion 20 is cut off entirely over the circumferential surface of the projected portion 43 lest the cuticle should be fitted into the recessed hole 44 of the stock 38. Thus, there can be prevented reliably an occurrence of rooting of the scion 20 that calluses formed on the uniting surfaces of the scion 20 in the stock 38 bear roots in the united portion.

Moreover, the lower end portion of the scion 20 is cut up in a state where it is inserted into the insertion hole 27 of the taper die member 23 to be positioned. Accordingly, even a seedling having a thin and soft stem such as a watermelon seedling can have a lower end portion thereof shaped up into a conical form corresponding to the lower portion of the insertion hole 27 while preventing the shape of the projected portion 43 from being disfigured.

Furthermore, the lower end portion of the scion 20 is cut up by rotating the taper die member 23 and the cutting blade 25 together with the turntable 22 while moving the cutting blade 25 upward and downward along the slanting surface 25 formed on the taper die member 23 by the cutting blade driving mechanism 26. Thus, the outer circumferential portion 20a can be cut smoothly and properly while obviating the likelihood that the lower end portion of the scion 20 is smashed by the cutting blade 25.

The projected portion 43 formed at the lower end portion of the scion 20 may not be shaped up into a perfect conical form, but may be a pyramid form approximate to the conical form or a frustum form. Further, it may not be necessary to set the angle of the conical form constituting the projected portion 43 of the scion 20 equal to the angle of the conical hole constituting the recessed hole 44 of the stock 38. These two angles may differ slightly, so that the projected portion 43 and the recessed hole 44 are sealably connected by deforming at least one of the both when the projected portion 43 is fitted into the recessed hole 44.

The drill 40 is rotated at the high speed of ten thousands per minute as mentioned above, which generates a suction to suck up waste chips produced when the stock 38 are being machined. Accordingly, no waste chips remain in the recessed hole 44 of the stock 38 and a desired recess can be formed in the stock 38. Thus, there can be reliably prevented an occurrence that sealability between the scion 20 and the stock 38 is deteriorated due to the existence of waste chips between the projected portion 43 of the scion 20 and the recessed hole 44 of the stock 38.

Further, it may be appropriate to form at the upper end portion of the stock 38 a projected portion having a conical surface and to form at the lower end portion of the scion 20 a recessed hole into which the projected portion is fitted. Although the foregoing embodiment is described with respect to an example in which the grafting method according to the invention is implemented using the grafting apparatus, the grafting method may be implemented as follows. The projected portion is cut up manually using a knife or the like and the recessed hole is formed using a drill or the like. Then, the scion and the stock are united manually.

Figure 10:
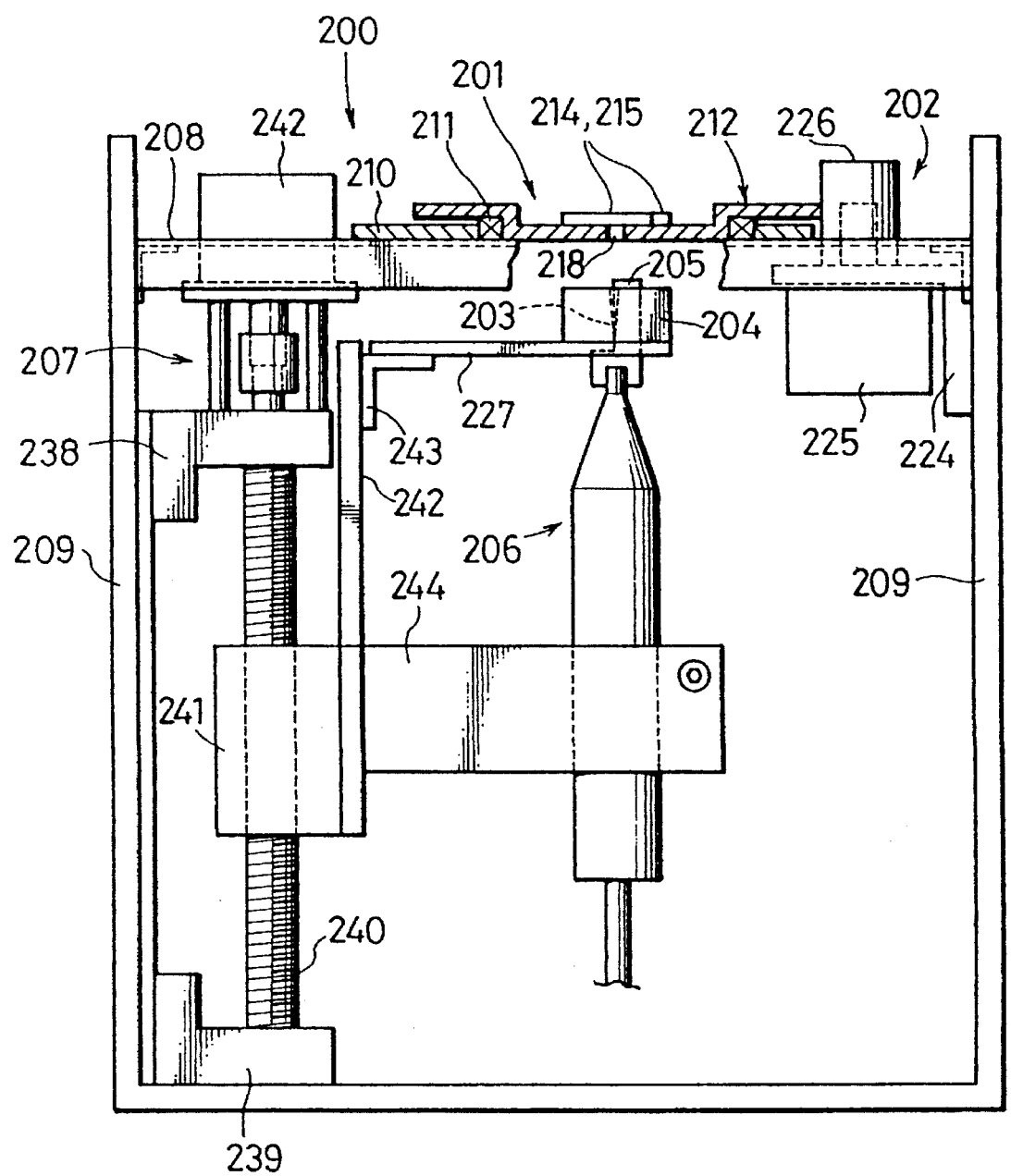
FIG. 10 is a front view of a second scion machining assembly provided in the grafting apparatus.

Referring next to FIG. 10 showing another scion machining assembly 200 provided in the grafting apparatus. The scion machining assembly 200 is provided with a holding device 201, a first drive device 202, a die member 204, a cutting blade 205, a ultrasonic drive device 206, and a second drive device 207. The holding device 201 holds a seedling to be grafted or a scion formed by cutting off a lower end portion of seedling such as watermelon, tomato, and egg plant. The first drive device 202 is adapted for driving the holding device 201. The die member 204 is formed with an insertion hole 203 into which a lower end portion of a seedling is inserted. The insertion hole 203 is in the form of an inverted cone. The cutting blade 205 extends along an inner surface of the insertion hole 203. The ultrasonic drive device 206 includes an ultrasonic drive device adapted for vibrating the cutting blade 205 upward and downward at a ultrasonic frequency. The second drive device 207 is adapted for moving the die member 204, the cutting blade 205, and the ultrasonic drive device 206 upward and downward.

Figure 11:
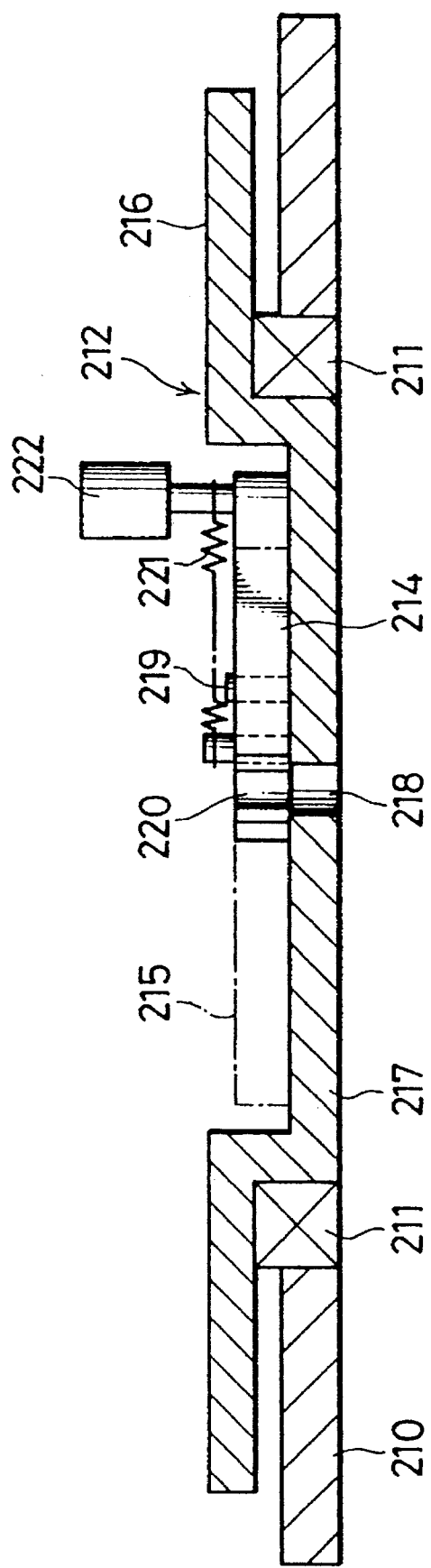
FIG. 11 is a sectional view of a holding device provided in the second scion machining assembly.
Figure 12:
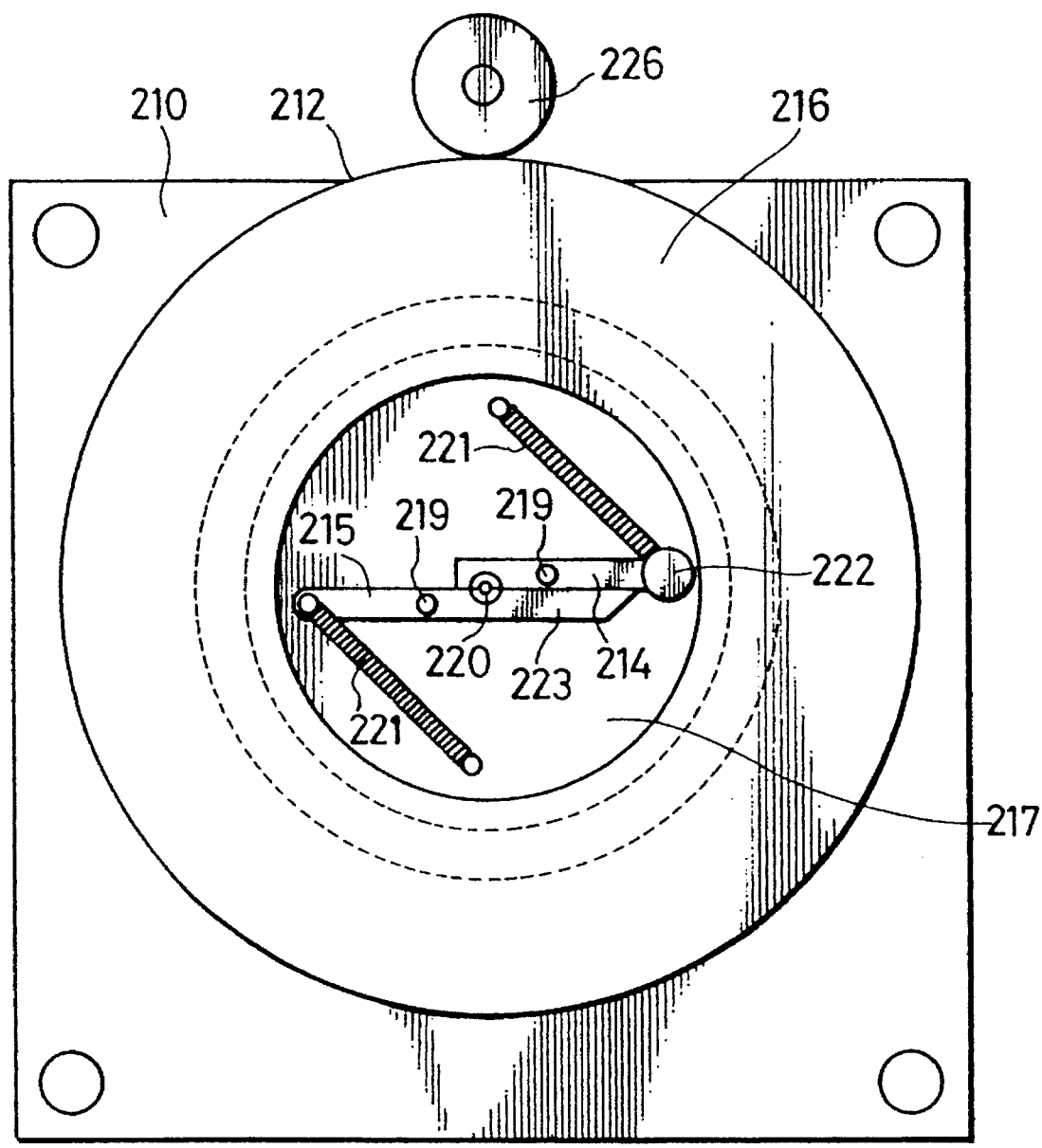
FIG. 12 is a top plan view of the holding device.

As shown in FIGS. 11 and 12, the holding device 201 for holding the seedling includes a stationary table 210, a support table 212, and a pair of grip members 214, 215 provided on the support table 212. The stationary table 210 is fixedly secured to a main frame 209 of the grafting apparatus by way of a support member 208. The support table 212 is rotatably supported on the stationary table 210 by means of roller bearings 211 provided on the stationary table 210.

The support table 212 includes a doughnut-like outer portion 216 and a center portion 217. At a center of the center portion 217 is formed a circular positioning hole 18 into which the seedling is to be inserted. The grip members 214, 215 are disposed opposing to each other at the positioning hole 218. Each of the grip members 214, 215 is pivotally supported on the center portion 217 at an intermediate portion of the grip member by a pivot pin 219 fixedly attached on the center portion 217.

Also, the grip members 214, 215 have gripping portions 220 for gripping the seedling at their respective positions of inner walls corresponding to the positioning hole 218. The respective gripping portion 220 is in the form of a hemicycle and attached with a rubber sheet.

The grip members 214, 215 are forcibly made in contact with each other on the inner walls by springs 221. One end of the spring 221 is attached on an outer end of the grip member 214 while the other end of the spring 221 is attached on the support table 212. In this state, the respective gripping portions 220 of the grip members 214, 215 define a gripping hole above the positioning hole 218.

The grip member 214 is provided with a knob 222 for manual opening on an outer end portion thereof. The grip member 215 has an inner extension portion 223 extending beyond the pivotal portion 219 of the grip member 214.

Referring again to FIG. 10, the first drive device 202 includes a drive motor 225 and a roller 226. The drive motor 225 is mounted on the main frame 209 by way of a bracket 224, and the roller 226 is mounted on an output shaft of the drive motor 225. The roller 226 comes into frictional contact with an outer circumferential surface of the support table 212 to thereby transmit the driving force of the drive motor 225 to the support table 212. The support table 212 is rotated about the positioning hole 218 at a rotating speed of about 1 to 10 rpm.

Figure 13:
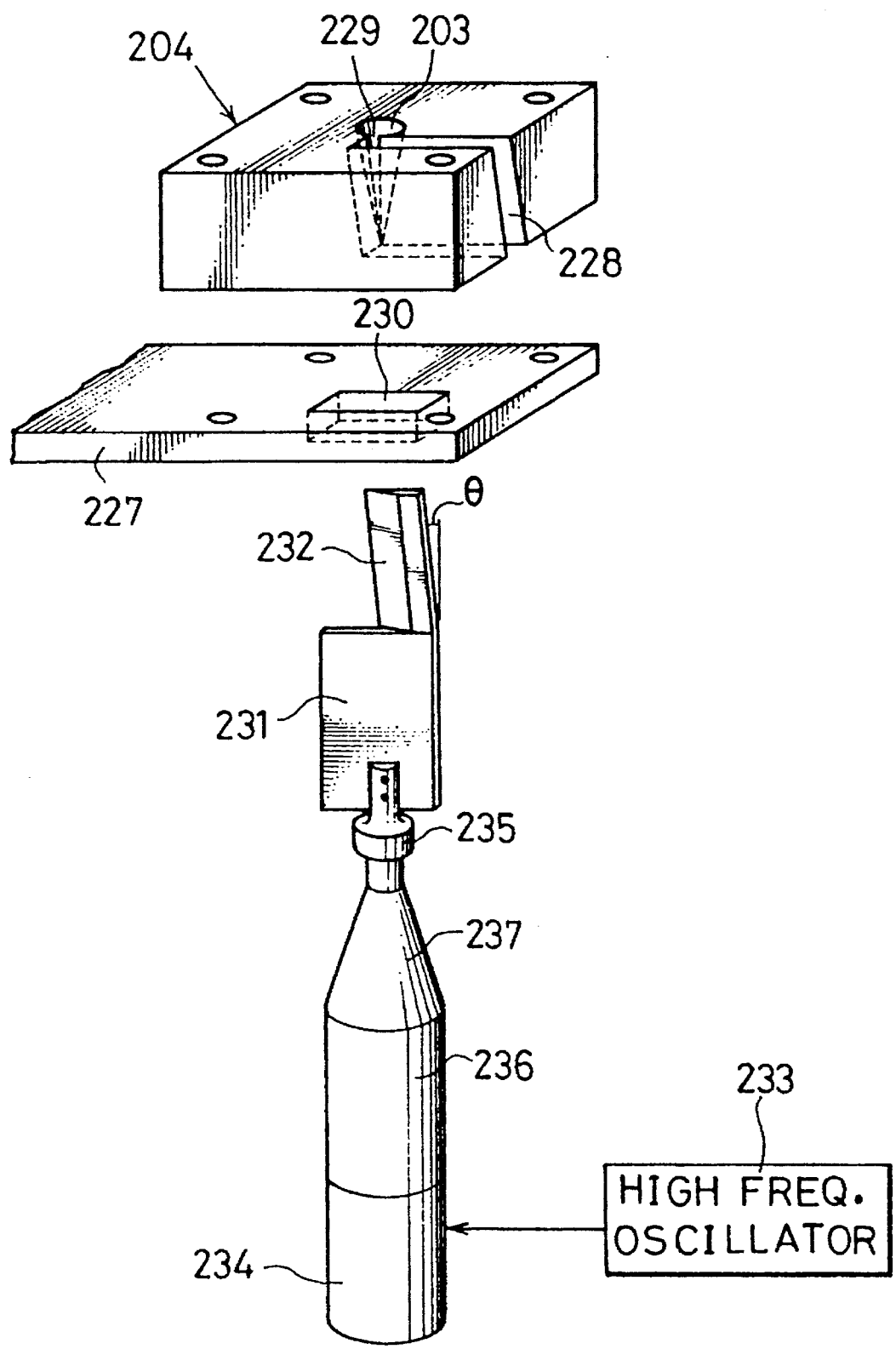
FIG. 13 is a perspective view showing a structural relationship between a die member, a cutting blade, and a ultrasonic drive device.

The die member 204 is in the form of a block, as shown in FIG. 13. The die member 204 is associated with a block 241 of the second drive device 207 to be described later by way of a die member supporting member 227. The die member 204 is formed with the inverted conical insertion hole 203. A stem of the seedling is inserted into the insertion hole 203 from above. The die member 204 is formed with a slot 228 extending to the insertion hole 203. There is defined an opening 229 at an intersecting portion between the insertion hole 203 and the slot 228. The slot 228 is adapted for positioning the cutting blade 205. The die member supporting member 227 is formed with a waste discharge passage 230 in a position corresponding to the slot 228.

The cutting blade 205 has a attachment portion 231 and a cutting portion 232. The attachment portion 231 is fixedly attached to a leading end portion of the ultrasonic drive device 6. The cutting portion 232 is inclined with respect to a general vertical edge of the attachment portion 231 θ degree corresponding to a generatrix of the inverted conical insertion hole 203 so that a cutting edge of the cutting portion 232 projects into the opening 229 parallel with the generatrix of the inverted conical insertion hole 203.

The ultrasonic drive device 206 includes a high frequency oscillator 233, an ultrasonic vibrator 234, a cone portion 236, and a horn portion 237. The ultrasonic vibrator 234 is vibrated by electric energy supplied by a high frequency oscillator 233. The cone portion 236 and the horn portion 237 amplify the vibration generated by the ultrasonic vibrator 234 and transmit the amplified vibration to the leading portion 235 to which the attachment portion of the cutting blade 205 is fixedly attached. Thereby, the cutting blade 205 is moved upward and downward by about 30 μm at a specified ultrasonic frequency, e.g., a frequency of about 20 to 40 kHz.

The second drive device 207 includes, as shown in FIG. 10, a drive shaft 240, the block 241, an unillustrated guide member for guiding a vertical movement of the block 241, and a drive motor 242. The drive shaft 240 is a screw shaft rotatably supported by upper and lower support brackets 238, 239 fixedly attached on the main frame 209. The block 241 is formed with a threaded hole with which the drive shaft 240 is meshed. The drive motor 242 is mounted on an upper surface of the upper support bracket 238.

The die member supporting member 227 is connected to the block 241 by way of a connecting member 243. Also, the ultrasonic drive device 206 is connected to the block 241 by way a support member 244. Accordingly, the die member 204 and the ultrasonic drive device 206 are integrally moved upward and downward by rotating the drive shaft 240 with the drive motor 242.

The grafting is carried out as follows using the grafting apparatus provided with the scion machining assembly 200.

Figure 14:
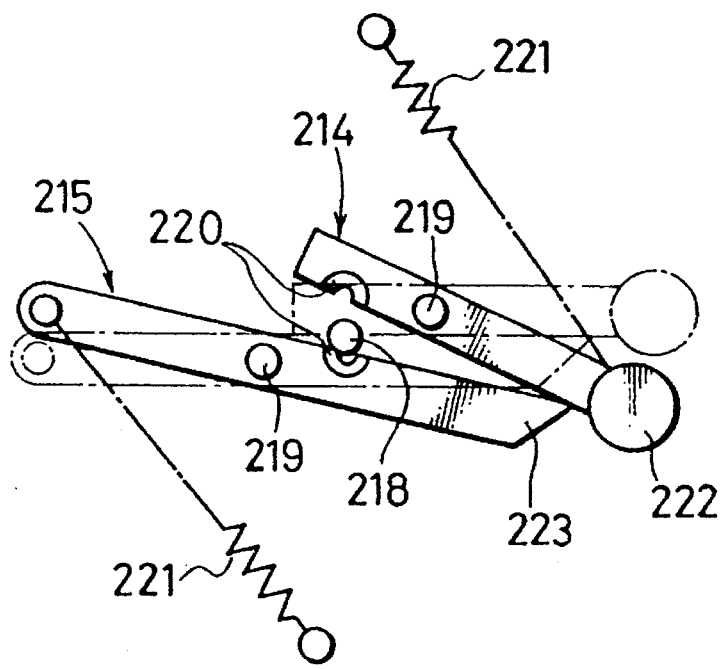
FIG. 14 is a perspective view showing operational states of grip members provided in the holding device.

First, as shown FIG. 14, the grip member 214 is pivoted clockwise about the pivot pin 219 against the spring 221 by gripping the knob 222 with a hand. Consequently, the gripping portion 220 of the grip member 214 is moved away from the positioning hole 218 of the support table 212. Also, the pivotal movement of the grip member 214 causes the inner extension portion 223 of the grip member 215 to pivot clockwise about the pivot pin 219 of the grip member 215 against the spring 219, consequently moving the gripping portion 220 of the grip member 215 away from the positioning hole 218.

In this state, into the positioning hole 218 is inserted a stem of a scion 245 formed by cutting off a lower end portion of an appropriately grown seedling. e.g., egg plant.

Figure 15:
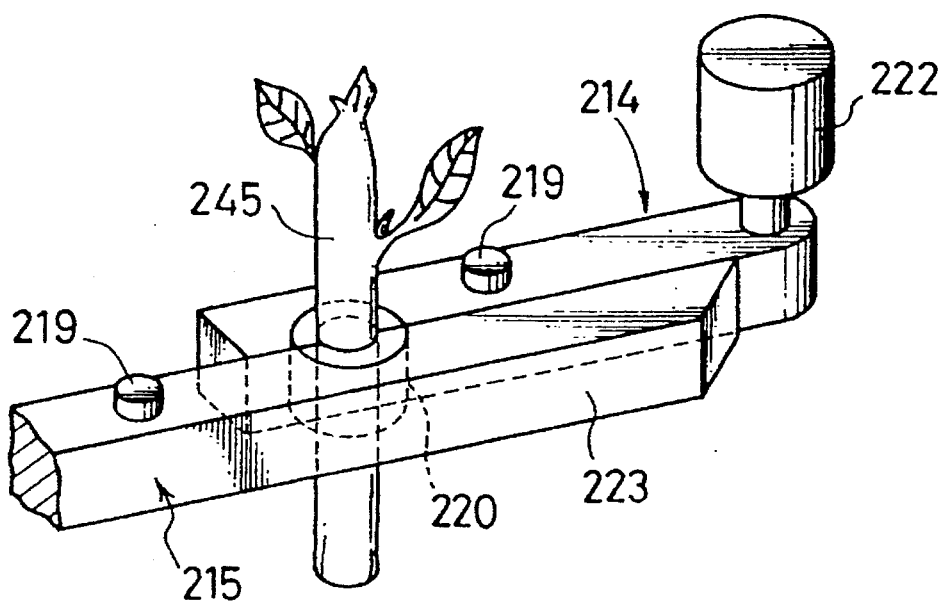
FIG. 15 is a perspective view showing a state where a scion is held by the grip members.

Subsequently, upon the hand hold of the knob 222 being released, the grip members 14 and 15 are returned into the initial state by the resilient force of the springs 221. Consequently, as shown in FIG. 15, the scion 245 is gripped by the gripping portions 220 of the grip members 214 and 215.

Next, the drive shaft 240 is rotated forward by the drive motor 242 of the second drive device 207. The forward rotation of the drive shaft 240 causes the block 241 to move upward, and to move the die member 204 and the ultrasonic drive device 206 upward. Consequently, the lower end portion of the scion 245 comes into the insertion hole 203 of the die member 204. Accordingly, the lower end portion of the scion 245 will be cut into an inverted conical shape.

Specifically, while the cutting blade 205 is vibrated upward and downward at a specified ultrasonic frequency by the ultrasonic drive device 206 and the support table 212 is rotated by the first drive means 202, the lower end portion of the scion 245 is inserted into the inverted conical insertion hole 203 by moving the support table 212 upward by the second drive device 207.

Figure 16:
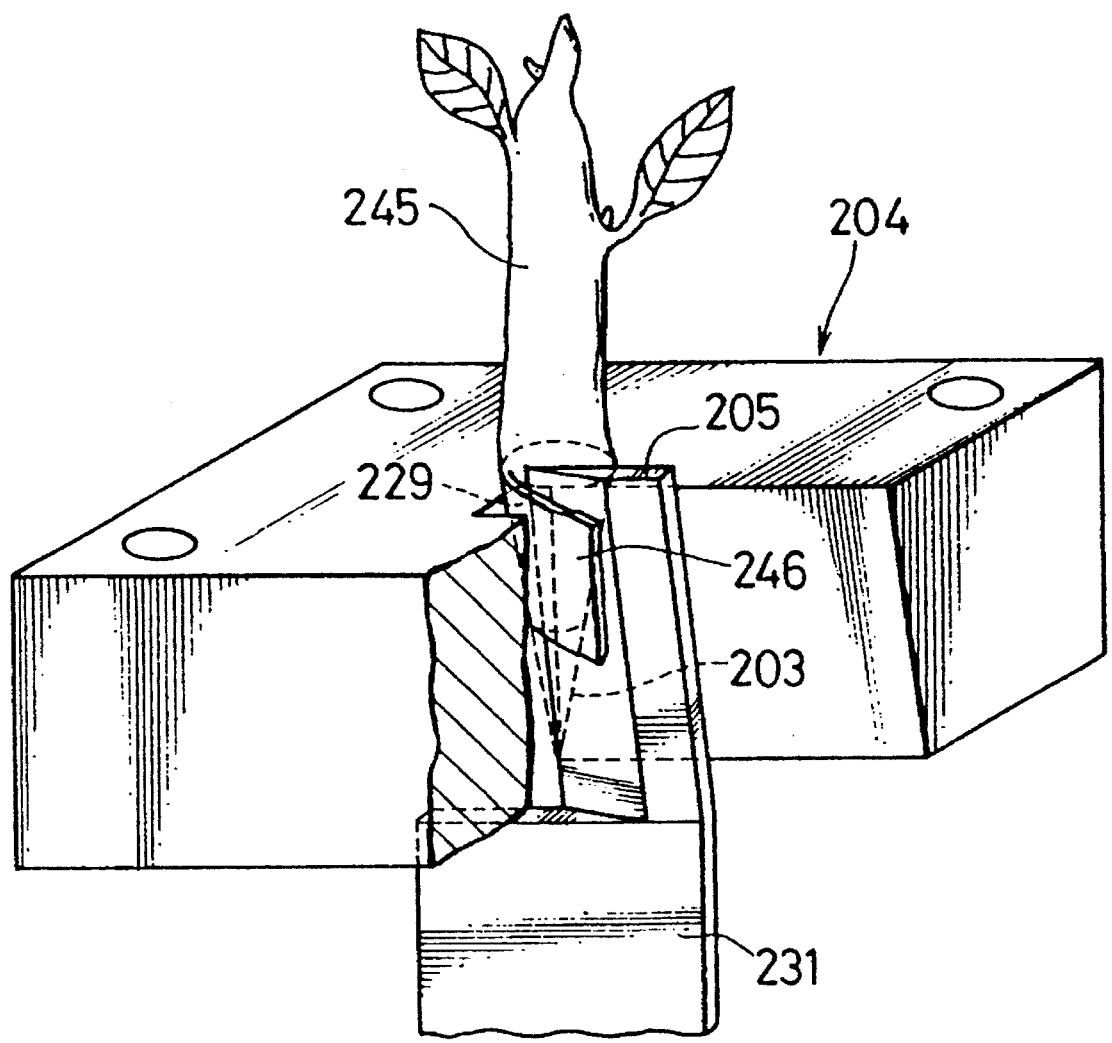
FIG. 16 is a perspective view showing a state where the scion is being cut.
Figure 17:
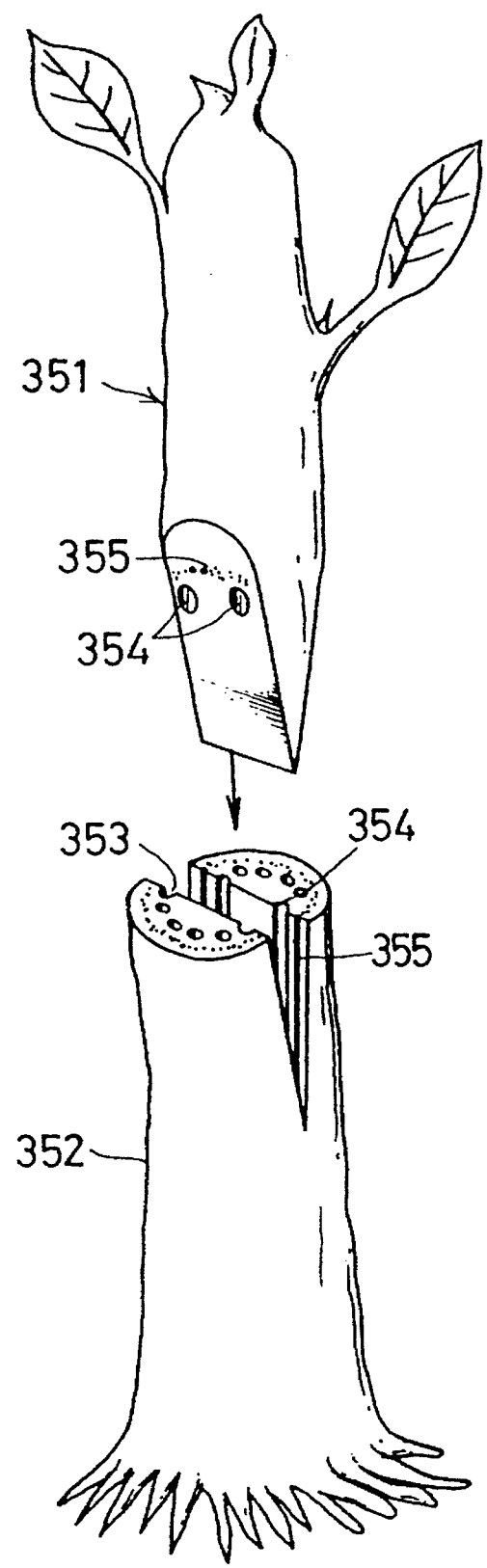
FIG. 17 is a perspective view showing machined scion and stock in a conventional grafting.

As shown in FIG. 16, an outer circumferential surface 246 of the lower end portion of the scion 245 is cut by the inclined cutting edge of the cutting blade 205 at the opening 229. Consequently, the lower end portion of the scion 245 is cut into the inverted conical shape corresponding to the inverted conical insertion hole 203.

As mentioned above, the lower end portion of the scion 245 is cut into an inverted conical shape by moving the cutting blade 205 upward and downward at the specified ultrasonic frequency alone the opening 229 formed in the die member 204 with the ultrasonic drive device 6 while rotating the scion 245 with the support table 212. Accordingly, a smooth cutting surface can be provided to the scion 245 rapidly without causing the cutting blade 205 to smash the lower end portion of the scion 245.

Specifically, since the lower end portion or the scion 245 is cut by the cutting blade 205 driven at a ultrasonic frequency, the lower end portion of the scion 245 can be smoothly cut without giving an excessive cutting shock to the scion 245. Therefore, a smooth cutting surface can be given to the scion 245 while keeping the cut portion or gripped portion of the scion 245 from being smashed by the cutting blade 205.

Further, the movement range of the cutting blade 205 can be set to be smaller than the size of a plant cell (50 to 100 μm), for example, at about 30 μm. Accordingly, there is no likelihood that the cutting blade 205 harms plant cells during the cutting operation.

In the holding device 201, furthermore, the support table 212 is formed with the positioning hole 218 for positioning the lower end portion of the scion 245. Also, the grip members 214 and 215 are pivotally provided on the support table 212 opposing to each other, and biased by the springs 221 so as to come into contact with each other above the positioning hole 218 to define the grip hole. Accordingly, the scion 245 can be gripped properly and rapidly.

Specifically, the grip members 214, 215 are forcibly rotated clockwise against the resilient force of the springs 221 to move their respective gripping portions 220 away from each other. In this state, the lower end portion of the scion 245 is inserted into the positioning hole 218 and be then set in an appropriate position. Thereafter, the opening state of the grip members 214, 215 is released. The grip members 214, 215 are rotated counterclockwise by the springs 221 and the respective gripping portions 220 consequently come closer to each other to grip a stem portion of the scion 245 at a suitable pressure.

In the foregoing embodiment, the support table 212 of the holding device 201 is rotated by the first drive device 202 to thereby rotate the scion 245 to form the inverted conical cutting surface. However, it may be appropriate to provide an arrangement for integrally rotating the die member 204, cutting blade 205, and ultrasonic drive device 206. In this construction, the cutting blade 205 is rotated around the lower end portion of the scion 245 to form the inverted conical cutting surface. Also, it may be appropriate to provide an arrangement for moving the holding device 201 upward and downward so as to insert the lower end portion of the scion 245 into the insertion hole 203 of the die member 204 instead of the arrangement in which the die member 204, cutting blade 205, and ultrasonic drive device 206 are integrally moved upward and downward.

What is claimed is:

1. A grafting apparatus for uniting a scion to a stock comprising:

holding means for holding either a scion or a stock;

a die member having a conical hole into which either a scion or a stock is inserted;

a cutting blade member arranged and movable along a generatrix of the conical hole;

a ultrasonic drive device for moving the cutting blade member upward and downward at a ultrasonic high speed;

first drive means for rendering a relative rotation between the holding means and the cutting blade member; and second drive means for rendering a relative movement between the holding means and the die member.

2. A grafting apparatus as defined in claim 1 wherein the holding means includes:

a support table having a positioning hole through which either a scion or a stock is inserted;

a pair of grip members opposed at the positioning hole, each member being pivotable and having a gripping portion at the positioning hole when the pair of grip members are made in contact with each other; and biasing means for biasing the pair of grip members so as to come into contact with each other.

* * * * *